(12) United States Patent
Lu et al.

(10) Patent No.: US 8,673,233 B2
(45) Date of Patent: Mar. 18, 2014

(54) SOLID REACTANT SHEET, SOLID REACTANT STACK, AND FUEL CARTRIDGE

(75) Inventors: Hsuan-Yi Lu, Hsinchu County (TW); Chih-Lin Ho, Hsinchu County (TW)

(73) Assignee: Young Green Energy Co., Hsinchu County (TW)

( * ) Notice: Subject to any disclaimer, the term of this patent is extended or adjusted under 35 U.S.C. 154(b) by 192 days.

(21) Appl. No.: 13/276,286

(22) Filed: Oct. 18, 2011

(65) Prior Publication Data
US 2012/0141334 A1 Jun. 7, 2012

(30) Foreign Application Priority Data
Dec. 3, 2010 (CN) .......................... 2010 1 0577857

(51) Int. Cl.
*B01J 7/02* (2006.01)
*B01J 7/00* (2006.01)

(52) U.S. Cl.
USPC ........... 422/239; 422/238; 422/211; 422/110; 48/61

(58) Field of Classification Search
USPC ................ 422/238, 239, 211, 110; 48/61
See application file for complete search history.

(56) References Cited

U.S. PATENT DOCUMENTS

| | | | | |
|---|---|---|---|---|
| 3,419,400 A | * | 12/1968 | Hayhurst et al. | ............... 426/124 |
| 3,942,511 A | * | 3/1976 | Black et al. | ............... 126/263.05 |
| 2008/0233462 A1 | | 9/2008 | Curello et al. | |

* cited by examiner

*Primary Examiner* — Lessanework Seifu
(74) *Attorney, Agent, or Firm* — Jianq Chyun IP Office

(57) ABSTRACT

A solid reactant sheet, a solid reactant stack, and a fuel cartridge are provided. The solid reactant sheet comprises an adhesive film and a plurality of solid reaction particles. The adhesive film has a first surface, a second surface opposite to the first surface, and a plurality of through holes connected between the first surface and the second surface. The plurality of solid reaction particles are adhered to the first surface, and the solid reaction particles react with a reactant for generating a gas. Furthermore, a solid reactant stack and a fuel cartridge are also provided.

19 Claims, 4 Drawing Sheets

SOLID REACTANT SHEET, SOLID REACTANT STACK, AND FUEL CARTRIDGE

CROSS-REFERENCE TO RELATED APPLICATION

This application claims the priority benefit of China application serial no. 201010577857.1, filed Dec. 3, 2010. The entirety of the above-mentioned patent application is hereby incorporated by reference herein and made a part of this specification.

BACKGROUND OF THE INVENTION

1. Field of the Invention

The invention relates to a solid reactant sheet, a solid reactant stack, and fuel cartridge which are used for generating a gas.

2. Description of Related Art

Energy is indispensable in our daily life all the time, but the damage to the environment caused by the development and application of energy is increasing day by day. Energy from fuel cells has several advantages, such as high efficiency, low noise, and no pollution, which is in accordance with the trend of this era.

The common types of fuel cells are the proton exchange membrane fuel cell (PEMFC) and the direct methanol fuel cell (DMFC). The gaseous fuels which are necessary for PEMFC are hydrogen gas and oxygen gas, in which the oxygen gas could be obtained by the environment and the hydrogen gas has to be supplied by the hydrogen generating device.

U.S. patent publication no. 2008/0233462 discloses that a solid reactant could be stored in a solid reactant container in the form of powder and could transport the water into the solid reactant container, so that the water reacts with the solid reactant to generate hydrogen gas needed for fuel cells.

SUMMARY OF THE INVENTION

The invention is directed to a solid reactant sheet which is capable to enhance the reacting efficiency.

The invention is directed to a solid reactant stack which is capable to enhance the reacting efficiency.

The invention is directed to a fuel cartridge which is capable to enhance the reacting efficiency.

Other objects and advantages of the invention can be further illustrated by the technical features broadly embodied and described as follows.

In order to achieve one or a portion of or all of the objects or other objects, one embodiment of the invention provides a solid reactant sheet including an adhesive film and a plurality of first solid reaction particles is provided. The adhesive film has a first surface, a second surface opposite to the first surface, and a plurality of through holes connected the first surface and the second surface. The plurality of first solid reaction particles are adhered to the first surface, and the first solid reaction particles react with a reactant for generating a gas.

According to an embodiment of the invention, the adhesive film of the solid reactant sheet is hydrophilic.

According to an embodiment of the invention, an inner diameter of each of the through holes of the solid reactant sheet ranges between 10 μm and 100 μm.

According to an embodiment of the invention, a material of the first solid reaction particles of the solid reactant sheet comprises metal hydride or metal.

According to an embodiment of the invention, an outer diameter of each of the first solid reaction particles of the solid reactant sheet ranges between 20 μm and 50 μm.

According to an embodiment of the invention, the adhesive film of the solid reactant sheet comprises a substrate and a first layer. The substrate has a first surface, a second surface, and a plurality of through holes. The first layer is disposed on the first surface so that the first solid reaction particles are adhered to the first surface through the first layer.

According to an embodiment of the invention, the solid reactant sheet further comprises a plurality of second solid reaction particles which are adhered to the second surface.

According to an embodiment of the invention, a material of the second solid reaction particles of the solid reactant sheet comprises metal hydride or metal.

According to an embodiment of the invention, an outer diameter of each of the second solid reaction particles of the solid reactant sheet ranges between 20 μm and 50 μm.

According to an embodiment of the invention, the adhesive film of the solid reactant sheet comprises a substrate, a first layer and a second layer. The substrate has a first surface, a second surface, and a plurality of through holes. The first layer is disposed on the first surface so that the first solid reaction particles are adhered to the first surface through the first layer. The second layer is disposed on the second surface so that the second solid reaction particles are adhered to the second surface through the second layer.

In order to achieve one or a portion of or all of the objects or other objects, one embodiment of the invention provides a solid reactant stack including a plurality of adhesive films and a plurality of solid reaction particles is provided. The adhesive films are sequentially stacked over and have a plurality of through holes. The solid reaction particles are adhered to the adhesive films respectively, wherein part of the solid reaction particles exist between every two adjacent adhesive films. The solid reaction particles react with a reactant for generating a gas.

According to an embodiment of the invention, the adhesive films of the solid reactant stack are hydrophilic.

According to an embodiment of the invention, an inner diameter of each of the through holes of the solid reactant stack ranges between 10 μm and 100 μm.

According to an embodiment of the invention, a material of the solid reaction particles of the solid reactant stack comprises metal hydride or metal.

According to an embodiment of the invention, an outer diameter of each of the solid reaction particles of the solid reactant stack ranges between 20 μm and 50 μm.

According to an embodiment of the invention, the orthogonal projections of the through holes onto the adhesive film do not overlap with the orthogonal projections of the through holes of another adjacent adhesive film onto the adhesive film.

In order to achieve one or a portion of or all of the objects or other objects, one embodiment of the invention provides a fuel cartridge including a solid reactant unit, a liquid reactant unit, and a pipe is provided. The solid reactant unit comprises a solid reactant container and a solid reactant stack which is accommodated in the solid reactant container. The solid reactant stack comprises a plurality of adhesive films and a plurality of solid reaction particles. The adhesive films are sequentially stacked over and have a plurality of through holes. The solid reaction particles are adhered to the adhesive films respectively, wherein part of the solid reaction particles exist between every two adjacent adhesive films. The liquid reactant unit comprises a liquid reactant container and a liquid reactant which is accommodated in the liquid reactant container. The pipe is connected between the solid reactant container and the liquid reactant container to transport the liquid reactant from the liquid reactant container to the solid reactant container. Herein the liquid reactant reacts with the solid reaction particles to generate a gas According to an embodiment of the invention, the fuel cartridge further comprises a transporting pump which is disposed on a path of the pipe, so that the liquid reactant is capable of being transported from the liquid reactant container to the solid reactant container.

According to an embodiment of the invention, the solid reactant container of the fuel cartridge has an inlet, for communicating with the pipe, and the liquid reactant enters the solid reactant container through the pipe via the inlet.

According to an embodiment of the invention, the solid reactant unit of the fuel cartridge further comprises a capillary structure which is disposed between the inlet and the solid reactant stack.

In light of the foregoing descriptions, in the embodiment of the invention, a plurality of solid reaction particles are adhered to the adhesive film to form the solid reactant sheet, and a solid reactant stack is formed by stacking the plurality of solid reactant sheets. When the liquid reactant is transported onto the solid reactant stack, the upper liquid reactant could be transported to the bottom of the solid reactant stack through the through holes of the adhesive films, so as to react with the solid reaction particles below. Thus, the reacting efficiency could be improved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
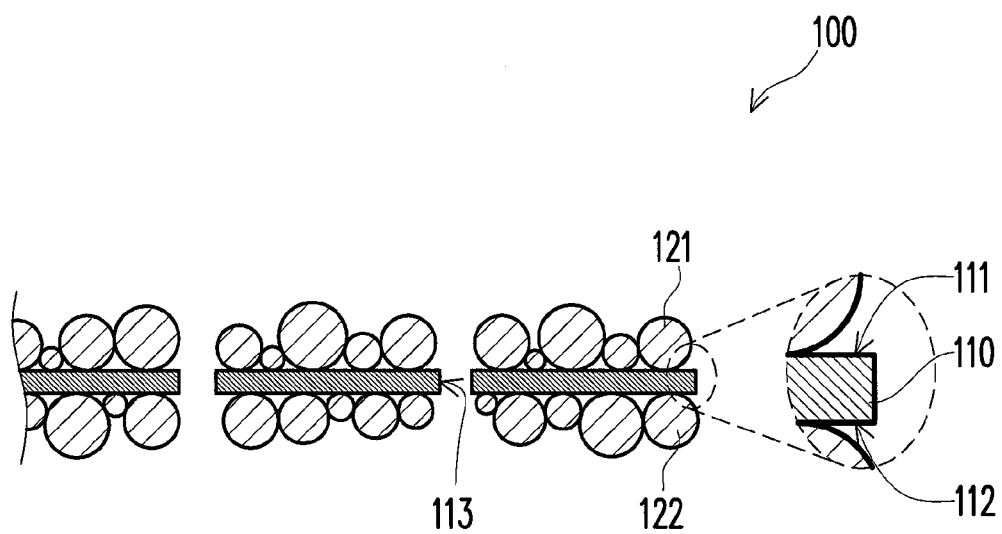
FIG. 1A is a side view of a portion of a solid reactant sheet according to an embodiment of the invention.
Figure 1B:
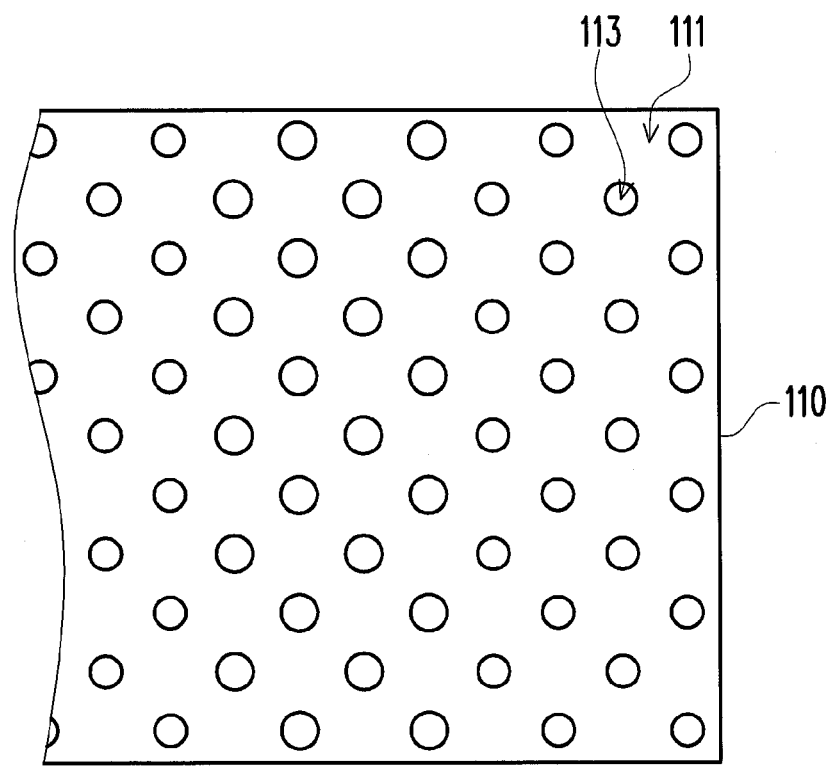
FIG. 1B is a top view of a portion of the adhesive film of FIG. 1A.

FIG. 1A is a side view of a portion of a solid reactant sheet according to an embodiment of the invention. FIG. 1B is a top view of a portion of the adhesive film of FIG. 1A. Referring to FIG. 1A and FIG. 1B, a solid reactant sheet 100 of the embodiment includes an adhesive film 110 and a plurality of first solid reaction particles 121. The adhesive film 110 has a first surface 111, a second surface 112 opposite to the first surface 111, and a plurality of through holes 113 connected the first surface 111 and the second surface 112. The first solid reaction particles 121 are adhered to the first surface 111.

In this embodiment, since the adhesive film 110 is hydrophilic, the liquid reactant (for example, water) is easy to being transported to the first solid reaction particles 121 through the adhesive film 110. In addition, an inner diameter of each of the through holes 113 of the adhesive film 110 ranges between 10 μm and 100 μm.

In this embodiment, a material of the first solid reaction particles 121 includes metal hydride or metal, for example, Sodium Borohydride ($NaBH_4$), Magnesium Hydride ($MgH_2$), Calcium Hydride ($CaH_2$) or Aluminum powder (Al). Therefore, the first solid reaction particles 121 could react with a reactant (not shown) to generate a gas. For instance, the first solid reaction particles 121 could react with the liquid reactant, for example, water, Malic Acid, Citric Acid, Sulphuric Acid ($H_2SO_4$), Baking Soda ($NaHCO_3$) solution or Calcium Carbonate ($CaCO_3$) solution to generate a gas such as hydrogen. Otherwise, the first solid reaction particles 121 could react with Cobalt(II)Chloride ($CoCl_2$) solution, Iron(II)Chloride ($FeCl_2$) solution, Cobalt(II)Sulphate ($CoSO_4$) solution or Nickel(II)Chloride ($NiCl_2$) solution which includes a catalyst to generate a gas, but the invention is not limited to the aforementioned. In addition, an outer diameter of each of the first solid reaction particles 121 ranges between 20 μm and 50 μm.

In this embodiment, the solid reactant sheet 100 could further include a plurality of catalysts (not shown) such as Cobalt(II)Chloride ($CoCl_2$), Iron(II)Chloride ($FeCl_2$), Cobalt (II)Sulphate ($CoSO_4$) or Nickel(II)Chloride ($NiCl_2$). The catalysts are adhered to the first surface 111 of the adhesive film 110 to increase the reacting rate between the first solid reaction particles 121 and the reactant.

Moreover, the solid reactant sheet 100 further includes a plurality of second solid reaction particles 122 which are adhered to the second surface 112 of the adhesive film 110. A material of the second solid reaction particles 122 includes metal hydride or metal, for example, Sodium Borohydride ($NaBH_4$), Magnesium Hydride ($MgH_2$), Calcium Hydride ($CaH_2$) or Aluminum powder (Al), but the invention is not limited thereto. The second solid reaction particles 122 could react with a reactant to generate a gas (for example, hydrogen), and the first solid reaction particle 121 and the second solid reaction particle 122 could be either the same or different. In addition, an outer diameter of the second reaction particle 122 ranges between 20 μm and 50 μm.

In this embodiment, the through holes 113 could be formed on the adhesive film 110 by punching process either before or after the first solid reaction particles 121 and the second solid reaction particles 122 are adhered to the adhesive film 110. The above mentioned punching process could be achieved by using a needle bed which includes round needles or hooked needles.

Roll-to-Roll manufacturing process could be used for continuous manufacturing, so that the first solid reaction particles 121 and the second solid reaction particles 122 are adhered to the first surface 111 and the second surface 112 of the adhesive film 111 respectively and the through holes 113 are formed. Furthermore, in order to avoid the front and rear segments of the adhesive film 110 sticking together during rolling to the scroll, a release paper could be stuck either to the first surface 111 or the second surface 112 of the adhesive film 110 beforehand. The first solid reaction particles 121 or the second solid reaction particles 122 could be adhered after the release paper is removed.

Figure 2A:
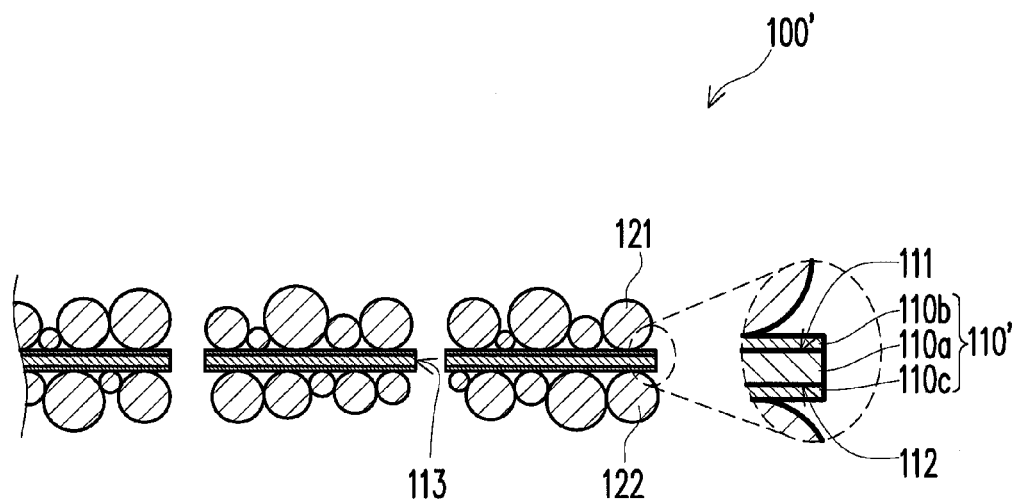
FIGS. 2A and 2B are side views of a portion of a solid reactant sheet according to another embodiment of the invention respectively.

FIG. 2A is a side view of a portion of a solid reactant sheet according to another embodiment of the invention. Referring to FIG. 2A, compared to the adhesive film 110 of the solid reactant sheet 100 in the embodiment of FIG. 1, the adhesive film 110' of the solid reactant sheet 100' of this embodiment includes a substrate 110a, a first layer 110b and a second layer 110c. The substrate 110a has a first surface 111, a second surface 112, and a plurality of through holes 113. The first layer 110b is disposed on the first surface 111, so that the first solid reaction particles 121 are adhered to the first surface 111 through the first layer 110b. The second layer 110c is disposed on the second surface 112, so that the second solid reaction particles 122 are adhered to the second surface 112 through the second layer 110c.

In this embodiment, the substrate 110a could be a hydrophilic non-woven fabric (for example, rayon) which could facilitate the diffuseness of the liquid reactant.

Figure 2B:
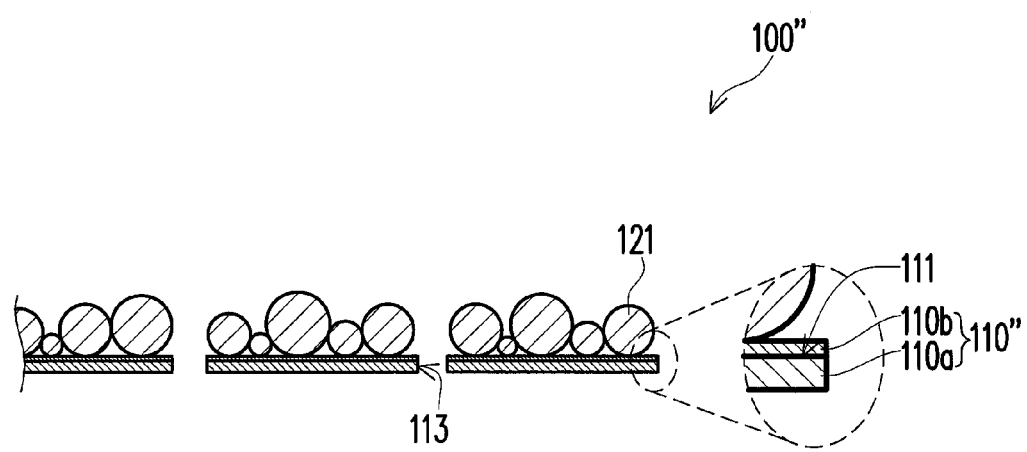

FIG. 2B is a side view of a portion of a solid reactant sheet according to another embodiment of the invention. Referring to FIG. 2B, compared to the adhesive film 110' of the solid reactant sheet 100' of the embodiment of FIG. 2A, the solid reactant sheet 100" of this embodiment includes an adhesive film 110" and a plurality of first solid reaction particles 121. The adhesive film 110" includes a substrate 110a and a first layer 110b. The first solid reaction particles 121 are adhered to the first surface 111 of the substrate 110a through the first layer 110b.

In this embodiment, the through holes 113 could also be formed on the adhesive film 110' by punching process. Roll-to-Roll manufacturing process and a release paper could also be used and please refer to the aforementioned description in details.

Figure 3:
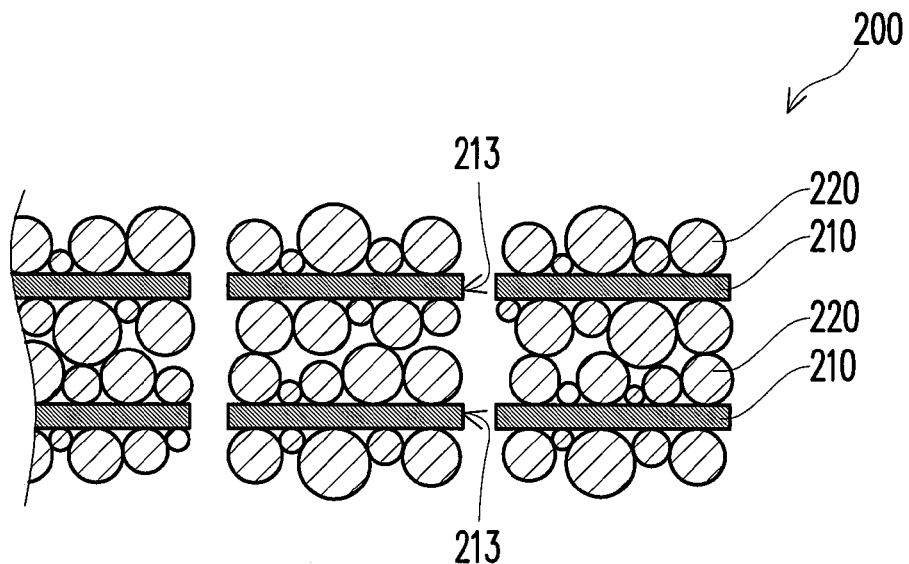
FIG. 3 is a side view of a portion of a solid reactant stack according to another embodiment of the invention.

FIG. 3 is a side view of a portion of a solid reactant stack according to another embodiment of the invention. Referring to FIG. 3, the solid reactant stack 200 of this embodiment includes a plurality of adhesive films 210 (only two adhesive films are shown) and a plurality of solid reaction particles 220. The adhesive films 210 are stacked over sequentially and have a plurality of through holes 213. The solid reaction particles 220 are adhered to the adhesive films 210 respectively, wherein part of the solid reaction particles 220 exist between every two adjacent adhesive films 210.

Similar to the embodiment of FIG. 1, since the adhesive films 210 are hydrophilic, the liquid reactant (for example, water) is easy to be transported to the solid reaction particles 220 through the adhesive film 210. In addition, an inner diameter of the through hole 213 of the adhesive film 210 ranges between 10 μm and 100 μm.

Similar to the first solid reaction particles 121 in the embodiment of FIG. 1, a material of the solid reaction particles 220 includes metal hydride or metal. The solid reaction particles 220 could react with a react to generate a gas (for example, hydrogen), and please refer to aforementioned description for the details of the solid reaction particles 220 and the reactant. In addition, an outer diameter of the solid reaction particle 220 ranges between 20 μm and 50 μm.

Figure 4:
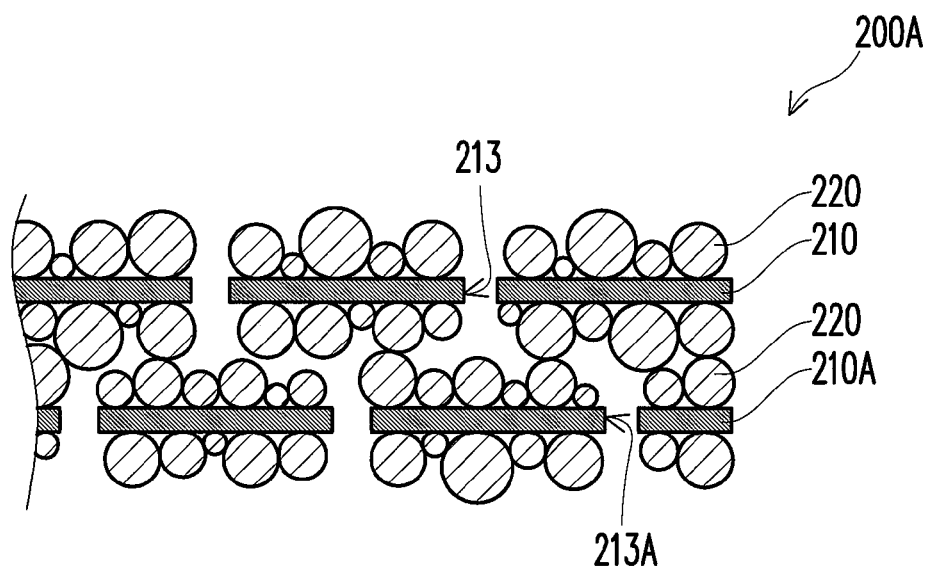
FIG. 4 is a side view of a portion of a solid reactant stack according to another embodiment of the invention.

FIG. 4 is a side view of a portion of a solid reactant stack according to another embodiment of the invention. Referring to FIG. 4, compared to the solid reactant stack 200 in the embodiment of FIG. 3, the solid reactant stack 200A of this embodiment includes a plurality of adhesive films 210, 210A (only two adhesive films are shown) and a plurality of solid reaction particles 220. The orthogonal projections of the through holes 213 onto the adhesive film 210 do not overlap with the orthogonal projections of the through holes 213A of another adjacent adhesive film 210A onto the adhesive film 210.

Figure 5:
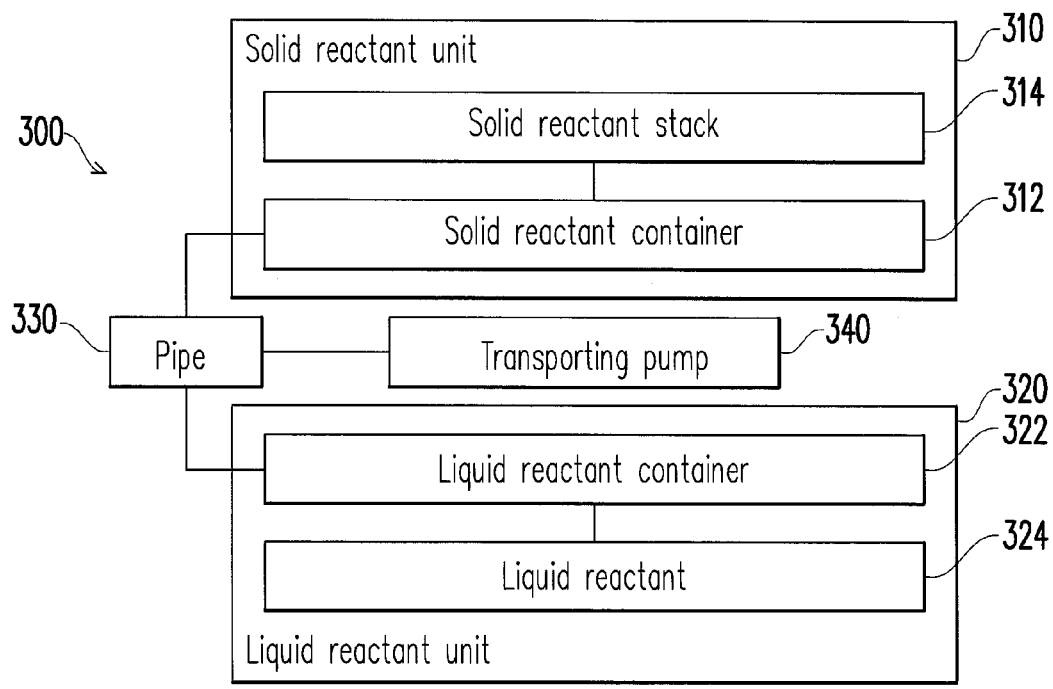
FIG. 5 illustrates a fuel cartridge of another embodiment of the invention.

FIG. 5 illustrates a fuel cartridge of another embodiment the invention. Referring to FIG. 5, the fuel cartridge 300 of this embodiment includes a solid reactant unit 310, a liquid reactant unit 320, and a pipe 330.

The solid reactant unit 310 includes a solid reactant container 312 and a solid reactant stack 314 which is accommodated in the solid reactant container 312. The solid reactant stack 314 could be either the solid reactant stack 200 in the embodiment of FIG. 3 or the solid reactant stack 200A in the embodiment of FIG. 4.

The liquid reactant unit 320 includes a liquid reactant container 322 and a liquid reactant 324 accommodated in the liquid reactant container 322.

The pipe 330 is connected the solid reactant container 312 and the liquid reactant container 322. The pipe is used for transporting the liquid reactant 324 from the liquid reactant container 322 to the solid reactant container 312.

In this embodiment, the fuel cartridge 300 further includes a transporting pump 340 which is disposed on a path of the pipe 330, so that the liquid reactant 324 could be transported from the liquid reactant container 322 to the solid reactant container 312.

Figure 6:
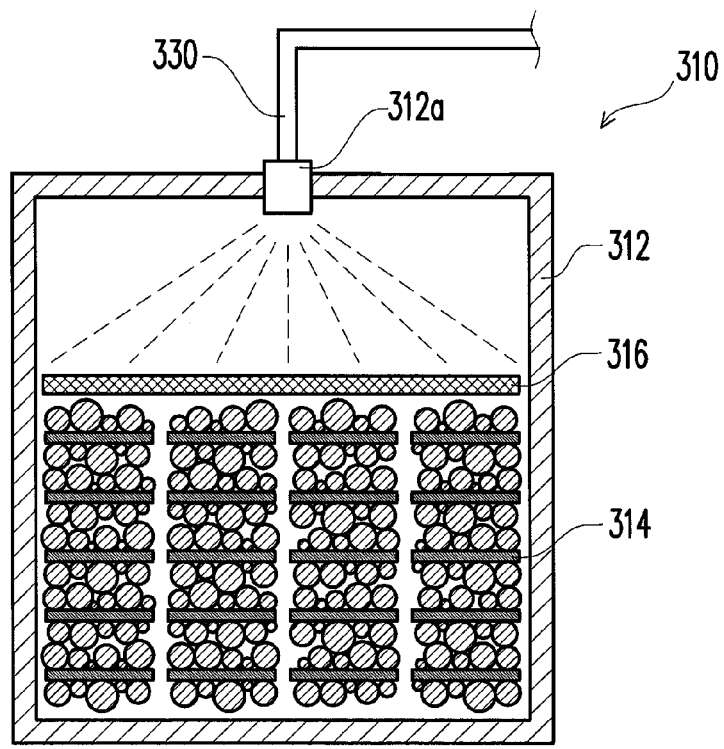
FIG. 6 illustrates the solid reactant unit and a portion of the pipe of FIG. 5.

FIG. 6 illustrates the solid reactant unit and a Portion of the pipe of FIG. 5. Referring to FIG. 6, the solid reactant stack 314 is accommodated in the solid reactant container 312 of the solid reactant unit 310. The solid reactant container 312 has an inlet 312a, for communicating with the pipe 330, and the liquid reactant 324 of FIG. 5 enters the solid reactant container 312 through the pipe 330 via the inlet 312a.

In this embodiment, the solid reactant unit 310 further includes a capillary structure 316 which is disposed between the inlet 312a and the solid reactant stack 314. Thus, the liquid reactant 324 could be spreaded by the capillary structure 316 onto the solid reactant stack 314 t to improve the reacting efficiency.

Additionally, in this embodiment, the liquid reactant is the liquid which could react with the solid reactant stack 314 to generate a gas (for example, hydrogen). The types of the liquid reactant could be referred to the aforementioned description but the invention is not limited thereto.

In summary, in the embodiments of the invention, a plurality of solid reaction particles are adhered to the adhesive film to form the solid reactant sheet, and a solid reactant stack is formed by stacking the plurality of solid reactant sheets. When the liquid reactant is transported onto the solid reactant stack, the upper liquid reactant could be transported to the bottom of the solid reactant stack through the through holes of the adhesive films, so as to react with the solid reaction particles below. Thus, the reacting efficiency could be improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A solid reactant sheet, comprising:
an adhesive film having a first surface, a second surface opposite to the first surface, and a plurality of through holes connected the first surface and the second surface;
a plurality of first solid reaction particles adhered to the first surface, the first solid reaction particles react with a reactant for generating a gas; and
a plurality of second solid reaction particles adhered to the second surface.

2. The solid reactant sheet as claimed in claim 1, wherein the adhesive film is hydrophilic.

3. The solid reactant sheet as claimed in claim 1, wherein an inner diameter of each of the through holes ranges between 10 μm and 100 μm.

4. The solid reactant sheet as claimed in claim 1, wherein a material of the first solid reaction particles comprises metal hydride or metal.

5. The solid reactant sheet as claimed in claim 1, wherein an outer diameter of each of the first solid reaction particles ranges between 20 μm and 50 μm.

6. The solid reactant sheet as claimed in claim 1, wherein the adhesive film comprises:
a substrate having the first surface, the second surface, and the through holes; and
a first layer disposed on the first surface, so that the first solid reaction particles are adhered to the first surface through the first layer.

7. The solid reactant sheet as claimed in claim 1, wherein a material of the second solid reaction particles comprises metal hydride or metal.

8. The solid reactant sheet as claimed in claim 1, wherein an outer diameter of each of the second solid reaction particles ranges between 20 μm and 50 μm.

9. The solid reactant sheet as claimed in claim 1, wherein the adhesive film comprises:
a substrate having the first surface, the second surface, and the through holes;
a first layer disposed on the first surface, so that the first solid reaction particles are adhered to the first surface through the first layer; and
a second layer disposed on the second surface, so that the second solid reaction particles are adhered to the second surface through the second layer.

10. A solid reactant stack, comprising:
a plurality of adhesive films stacked over sequentially and having a plurality of through holes, wherein each of the adhesive films has a first surface and a second surface opposite to the first surface; and
a plurality of solid reaction particles adhered to the first surface and the second surface of each of the adhesive films respectively, wherein part of the solid reaction particles are adhered to the first surfaces and exist between every two adjacent adhesive films, other part of the solid reaction particles are adhered to the second surfaces, and the solid reaction particles react with a reactant for generating a gas.

11. The solid reactant stack as claimed in claim 10, wherein the adhesive films are hydrophilic.

12. The solid reactant stack as claimed in claim 10, wherein an inner diameter of each of the through holes ranges between 10 μm and 100 μm.

13. The solid reactant stack as claimed in claim 10, wherein a material of the solid reaction particles comprises metal hydride or metal.

14. The solid reactant stack as claimed in claim 10, wherein an outer diameter of each of the solid reaction particles ranges between 20 μm and 50 μm.

15. The solid reactant stack as claimed in claim 10, wherein orthogonal projections of the through holes onto the adhesive film do not overlap with orthogonal projections of the through holes of another adjacent adhesive film onto the adhesive film.

16. A fuel cartridge, comprising:
   a solid reactant unit, comprising:
      a solid reactant container; and
      a solid reactant stack accommodated in the solid reactant container, the solid reactant stack comprising:
         a plurality of adhesive films stacked over sequentially and having a plurality of through holes; and
         a plurality of solid reaction particles adhered to the adhesive films respectively, wherein part of the solid reaction particles exist between every two adjacent adhesive films;
   a liquid reactant unit, comprising:
      a liquid reactant container; and
      a liquid reactant accommodated in the liquid reactant container; and
   a pipe connected between the solid reactant container and the liquid reactant container to transport the liquid reactant from the liquid reactant container to the solid reactant container;
   wherein the liquid reactant reacts with the solid reaction particles for generating a gas.

17. The fuel cartridge as claimed in claim 16, wherein the fuel cartridge further comprises a transporting pump disposed on a path of the pipe, so that the liquid reactant is capable of being transported from the liquid reactant container to the solid reactant container.

18. The fuel cartridge as claimed in claim 16, wherein the solid reactant container has an inlet for communicating with the pipe, and the liquid reactant enters the solid reactant container through the pipe from the inlet.

19. The fuel cartridge as claimed in claim 18, wherein the solid reactant unit further comprises a capillary structure disposed between the inlet and the solid reactant stack.

* * * * *